C. F. KETTERING.
SYSTEM OF ELECTRICAL DISTRIBUTION AND CONTROL.
APPLICATION FILED NOV. 27, 1916.

1,337,363. Patented Apr. 20, 1920.

Witnesses

Inventor
Charles F. Kettering
By Kerr, Page, Cooper & Hayward
Attorneys

UNITED STATES PATENT OFFICE.

CHARLES F. KETTERING, OF DAYTON, OHIO, ASSIGNOR, BY MESNE ASSIGNMENTS, TO THE DELCO-LIGHT COMPANY, OF DAYTON, OHIO, A CORPORATION OF OHIO.

SYSTEM OF ELECTRICAL DISTRIBUTION AND CONTROL.

1,337,363.      Specification of Letters Patent.      Patented Apr. 20, 1920.

Application filed November 27, 1916. Serial No. 133,651.

*To all whom it may concern:*

Be it known that I, CHARLES F. KETTERING, a citizen of the United States of America, residing at Dayton, county of Montgomery, and State of Ohio, have invented certain new and useful Improvements in Systems of Electrical Distribution and Control, of which the following is a full, clear, and exact description.

The present invention relates to an improvement in the control of electrical charging systems, and more particularly to the control of systems, wherein storage batteries are adapted to be charged by electric generators.

One of the objects of the present invention is to provide an electrical system, wherein the batteries will be prevented from excessive over-charging by means which is adapted to be initially set in accordance with a battery charge indicator.

Further objects and advantages of the present invention will be apparent from the following description, reference being had to the accompanying drawings, wherein a preferred form of one embodiment of the present invention is clearly illustrated.

Figure 1:
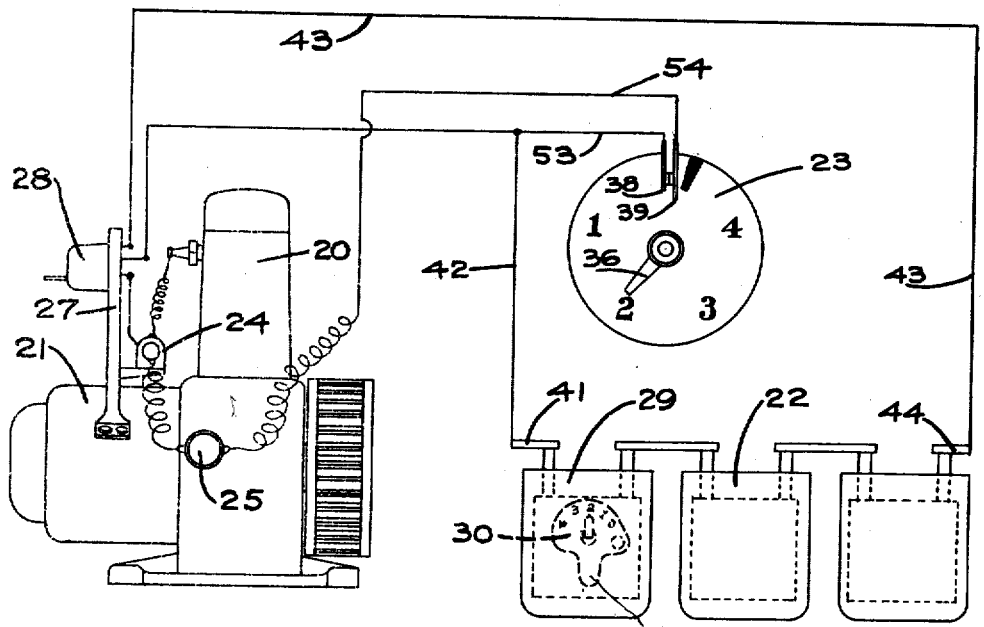
Figure 1 is a view, partly diagrammatic and partly elevational, of a system embodying the present improvements.

Referring to the drawings, and more particularly to Fig. 1, there is shown a battery charging system, which includes the engine 20, connected to an electric machine 21 which is capable of operation either as a motor for starting purposes, or as a generator for charging purposes. This electric machine is electrically connected to the storage batteries 22, through the circuit connections set forth more in detail hereinafter.

The engine 20 and the electric machine 21 are preferably of the type set forth and claimed in the co-pending applications of Charles F. Kettering and William A. Chryst, Serial No. 58,207, filed October 27, 1915, and Serial No. 120,098, filed September 14, 1916.

Inasmuch as the detail structure of the engine and electric machine do not specifically enter into the present invention, further description thereof is thought to be unnecessary in the present case.

The storage batteries 22 are connected to the electric machine 21 through the following circuit; from the positive terminal 41 of the battery, line wire 42, thence through the combined switch and circuit-breaker 28, which is mounted upon the switch-board 27, thence through the windings of the electric machine, back to the battery, via line wire 43, which connects with the negative terminal 44.

The generator circuit will be substantially the same in so far as the use of the line wires 43 and 42 are concerned, it of course being understood that the circuit arrangement of the electric machine may be changed to meet the requirements of the machine, when operating as a generator.

These circuit arrangements of the electric machine are clearly pointed out and claimed in the above-mentioned co-pending applications.

One of the cells 29 of the battery 22, is provided with a registering element 30, which is adapted to indicate the condition of charge of the battery. This registering element may be a hydrometer of any suitable type, but is preferably of the type described, claimed and illustrated in the co-pending application of Thomas Midgley, Jr., Serial No. 183,486, filed July 30, 1917.

Figure 2:
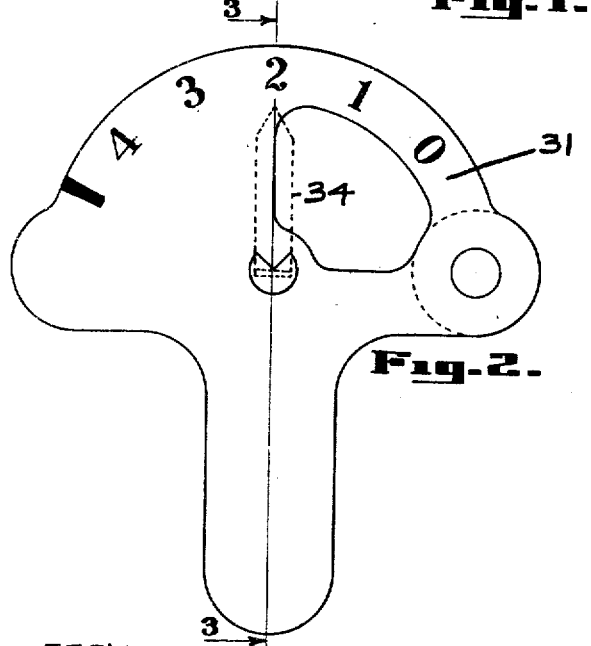
Fig. 2 is a view in elevation of a hydrometer unit removed from the battery cell.
Figure 3:
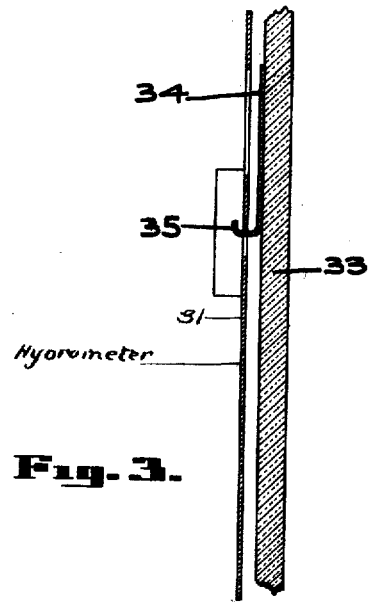
Fig. 3 is a view taken on the line 3—3 of Fig. 2, there also being shown in section one side of the battery jar to clearly illustrate the manner of mounting the hydrometer within the battery jar.

This hydrometer is clearly shown in Fig. 2, and includes a body portion 31 of any suitable material, such as celluloid, which is not susceptible to injury or chemical effect by coming in contact with the electrolyte in the battery. The upper portion of this hydrometer is enlarged, so that the shape of the hydrometer may be said to be that of a fan.

A series of calibrations are arranged on the hydrometer, and are indicated as is clearly shown in Fig. 2, by the numerals 0, 1, 2, 3 and 4. At one side of the hydrometer, a block or disk of rubber or other analogous material is secured, for the purposes clearly set forth in the co-pending application of Thomas Midgley, Jr., above referred to.

It is not thought that a detail description of the construction and operation of this hydrometer is necessary to a clear understanding of the present invention, and therefore no further detail description along these lines will be given in the present application.

The hydrometer is submerged within the electrolyte of the battery cell and is hung upon a supporting element 34, which is provided with a hooped portion 35. This supporting element acts as a hand or indicator, relative to the calibrations on the body of the hydrometer. The jar of the battery, designated by the numeral 33, is of transparent material, thereby readily permitting the attendant to ascertain the indications of the hydrometer.

The functions of this hydrometer are to indicate the status of charge of the battery by indicating the variations in the specific gravity of the electrolyte thereof, and it will therefore be seen that as the specific gravity of the electrolyte changes, this hydrometer will also actuate and thus indicate these variations by the movement of the hydrometer relative to the indicator.

The calibrations on the hydrometer correspond to the time intervals necessary for the operation of the electric machine, to bring the battery to fully charged condition, and thereby bring the specific gravity thereof to a predetermined point.

Now, if the hydrometer indicates, as shown in Fig. 1, the attendant is informed that the engine should be run a predetermined length of time, and in the present instance this may be for a period of two hours, providing that the calibrations on the hydrometer have been made to correspond to time intervals as computed in hours. That is, if the hydrometer indicates 2, as is shown in Fig. 1, the engine should be operated for a period of two hours, at the end of which period, sufficient current will have passed into the battery to bring the same to a fully charged condition.

In order to control this periodic operation of the engine, a measuring device or controlling mechanism, designated by the numeral 23, is provided with a series of calibrations, arranged in correspondence with the calibrations carried by the hydrometer. This measuring device is provided with a suitable operating mechanism, not shown, which tends to actuate the hand or indicator 36, and is adapted to be set manually by the attendant, on the same calibration as that indicated on the hydrometer.

After the attendant has manually set the indicating arm 36, the engine is brought into operation and operates continuously to drive the generator, and thereby force current into the battery until the indicating arm 36 is actuated in the direction of the arrow shown in Fig. 1, until it reaches zero, 0, or home position, in which position it will engage with the contact plate 39 and separate the same from contact with the plate 38.

Both the contact plates 38 and 39 are included in the ignition circuit, which is normally closed at the time of starting the engine. This circuit is as follows: from the battery terminal 41, through line wire 42, branch wire 53, across the contacts 38 and 39, branch wire 54 to the timing device 25, through the high tension coil 24, back to the opposite side of the battery through the controller switch 28 and line wire 43.

As soon as the contacts 38 and 39 are opened, the ignition circuit will be broken and the engine will be brought to a stop, thereby also bringing the generator to a stop and preventing further charging of the batteries.

If, for any reason, there should be a difference in the calibrations of the hydrometer and the measuring device, and the hydrometer should still show that the battery has not been brought up to a fully charged condition, the attendant will again manually set the indicating arm 36 to a point corresponding to the indication on the hydrometer, and again bring the engine into operation.

The same operation as that described above will again take place until the ignition system has been broken and the engine brought to a stop.

As soon as the charging rate of the generator reaches a determined low point, the circuit breaker or controller will automatically tend to break the main charging circuit between the battery and the charging unit.

The above is clearly described claimed and illustrated in the co-pending application of Ernest Dickey, Serial No. 119,888, filed September 13, 1916, and therefore further detailed description of this device is deemed unnecessary in the present application.

While the form of mechanism herein shown and described constitutes a preferred form of embodiment of the invention, it is to be understood that other forms might be adopted, all coming within the scope of the claims which follow.

What I claim is as follows:

1. In a device of the character described, the combination with an engine and charging unit driven by the engine; of a storage battery; a device located within said battery for visibly indicating the state of charge thereof during its charging and discharging operation; and means adapted to be set in accordance with said indicating device automatically to discontinue the operation of the engine and charging unit after the charging unit has operated a predetermined time interval.

2. In a device of the character described, the combination with an engine and generator driven thereby; of a storage battery charged by said generator; a hydrometer contained in said battery and calibrated visibly to indicate the condition of charge of said battery during its charging and discharging operation; and means calibrated to correspond with the calibration of the hydrometer and adapted to be set in accordance with the indication of the hydrometer whereby said means will automatically cut out the operation of the generator and engine after the generator had charged the battery for a predetermined time interval.

3. In a device of the character described, the combination with a constant speed engine having an ignition system; of a generator driven thereby; a storage battery electrically connected to said generator; a calibrated hydrometer associated with the storage battery and adapted to indicate the condition of charge thereof; and means adapted to be set in predetermined accordance with indicated calibration of the hydrometer and adopted to render inoperative the ignition system of the engine and thereby automatically stop the operation of the generator after the charging unit has operated a predetermined time interval.

4. In a device of the character described, the combination with a constant speed engine having an ignition system; of a generator driven thereby; a storage battery electrically connected to said generator; a calibrated hydrometer associated with the storage battery and adapted to indicate the condition of charge thereof; a clock mechanism having a dial provided with a series of calibrations thereon, corresponding to the calibrations of the hydrometer; a manually operated indicator operated by said clock mechanism adapted to be set on the calibration corresponding to the indicated calibration of the hydrometer; and contact devices associated with the ignition system and adapted to be actuated by said indicator when the indicator reaches a predetermined point whereby the ignition system of the engine will be rendered inoperative and the generator prevented from further charging the battery.

In testimony whereof I affix my signature in the presence of two subscribing witnesses.

CHARLES F. KETTERING.

Witnesses:
WALTER H. RIEDEL,
JOSEPH W. McDONALD.

Certificate of Correction.

It is hereby certified that the assignee in Letters Patent No. 1,337,363, granted April 20, 1920, upon the application of Charles F. Kettering, of Dayton, Ohio, for an improvement in "Systems of Electrical Distribution and Control," was erroneously described and specified as "The Delco-Light Company, of Dayton, Ohio, a Corporation of Ohio," whereas said assignee should have been described and specified as *Delco-Light Company, of Dayton, Ohio, a Corporation of Delaware*, as shown by the records of assignments in this office; page 3, line 31, claim 3, for the words "charging unit" read *generator;* and that the said Letters Patent should be read with these corrections therein that the same may conform to the record of the case in the Patent Office.

Signed and sealed this 9th day of May, A. D., 1922.

[SEAL.]                                            KARL FENNING,
*Acting Commissioner of Patents.*